US007706789B2

(12) United States Patent
Qi et al.

(10) Patent No.: US 7,706,789 B2
(45) Date of Patent: Apr. 27, 2010

(54) TECHNIQUES TO MANAGE ROAMING

(75) Inventors: Emily H. Qi, Portland, OR (US); Jesse Walker, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 11/096,392

(22) Filed: Mar. 31, 2005

(65) Prior Publication Data

US 2006/0223526 A1    Oct. 5, 2006

(51) Int. Cl.
*H04W 4/00* (2009.01)
*H04W 36/00* (2009.01)

(52) U.S. Cl. .............. 455/432.1; 455/422.1; 455/432.3; 455/436; 455/437; 455/444

(58) Field of Classification Search ... 455/432.1–432.3, 455/435.1, 435.2, 435.3, 433–434, 436–451, 455/452.1, 452.2, 453–455, 41.2, 550.1, 455/552.1, 554.1, 554.2, 555, 557–561, 562.1, 455/575.7, 556.1, 556.2, 410–411, 418–420, 455/422.1, 440–444, 517, 524–525, 551; 370/334, 339, 492–496, 328–333, 338, 341, 370/349, 395.52, 400–408, 474–475, 395.5–395.54; 342/422–449; 343/751
See application file for complete search history.

(56) References Cited

U.S. PATENT DOCUMENTS

| | | | | |
|---|---|---|---|---|
| 5,546,397 A | * | 8/1996 | Mahany | 370/310 |
| 5,796,727 A | * | 8/1998 | Harrison et al. | 370/338 |
| 5,960,344 A | * | 9/1999 | Mahany | 455/432.2 |
| 6,108,364 A | * | 8/2000 | Weaver et al. | 375/130 |
| 6,370,185 B1 | * | 4/2002 | Schmutz et al. | 375/214 |
| 6,917,804 B2 | * | 7/2005 | Takayama et al. | 455/432.1 |
| 6,990,343 B2 | * | 1/2006 | Lefkowitz | 455/436 |
| 7,050,793 B1 | * | 5/2006 | Kenward et al. | 455/414.4 |
| 7,376,425 B2 | * | 3/2008 | Laroia et al. | 455/437 |
| 2002/0196761 A1 | * | 12/2002 | Kaneko | 370/338 |
| 2003/0112766 A1 | | 6/2003 | Riedel et al. | |
| 2004/0001467 A1 | * | 1/2004 | Cromer et al. | 370/338 |

(Continued)

FOREIGN PATENT DOCUMENTS

KR    2004028062 A1 *  4/2004

OTHER PUBLICATIONS

Gopal R. et al., "Policy Based Access Router Selections and Context Transfers in Mobile IP Network," Conference on Network Control and Engineering for Quality of Service, Security, and Mobility, Oct. 23, 2002, pp. 3-14, XP002966424.

(Continued)

*Primary Examiner*—Meless N Zewdu
(74) *Attorney, Agent, or Firm*—Kacvinsky LLC

(57) ABSTRACT

A system, apparatus, method and article to manage roaming in a wireless communication system are described. An apparatus may include a first wireless device having a processor to receive roaming information for a second wireless device from a third wireless device, and send the roaming information to the second wireless device to establish a connection with the third wireless device. Other embodiments are described and claimed.

16 Claims, 5 Drawing Sheets

U.S. PATENT DOCUMENTS

| | | |
|---|---|---|
| 2004/0121771 A1 | 6/2004 | Song et al. |
| 2004/0132402 A1* | 7/2004 | Agashe et al. ............... 455/3.01 |
| 2004/0132452 A1* | 7/2004 | Lee ............................ 455/445 |
| 2004/0185852 A1* | 9/2004 | Son et al. .................... 455/438 |
| 2004/0198220 A1* | 10/2004 | Whelan et al. ............. 455/41.1 |
| 2004/0224690 A1* | 11/2004 | Choi et al. .................. 455/436 |
| 2005/0026615 A1* | 2/2005 | Kim ............................ 455/436 |
| 2005/0053043 A1* | 3/2005 | Rudolf et al. ............... 370/337 |
| 2005/0080884 A1* | 4/2005 | Siorpaes et al. ............. 709/223 |
| 2005/0220054 A1* | 10/2005 | Meier et al. .................. 370/331 |
| 2005/0237985 A1* | 10/2005 | Stewart et al. .............. 370/338 |
| 2006/0035639 A1* | 2/2006 | Etemad et al. .............. 455/436 |
| 2006/0083377 A1* | 4/2006 | Ptasinski ..................... 380/270 |
| 2006/0140135 A1* | 6/2006 | Bonta et al. .................. 370/254 |

OTHER PUBLICATIONS

PCT International Search Report, International Application No. PCT/US2006/012598, Date of Mailing: Aug. 1, 2006, pp. 1-3.

* cited by examiner

TECHNIQUES TO MANAGE ROAMING

BACKGROUND

In a wireless communication system, wireless communication devices may roam from one wireless access point (AP) to another AP. When moving to a new AP, a wireless communication device may need to reestablish a connection with the new AP without disrupting network service. Such operations are sometimes referred to as "handoff" operations. Latency in establishing the new connection may be undesirable. Techniques to improve such operations may therefore improve performance for a wireless communication device, and potentially overall system performance.

DETAILED DESCRIPTION

Figure 1:
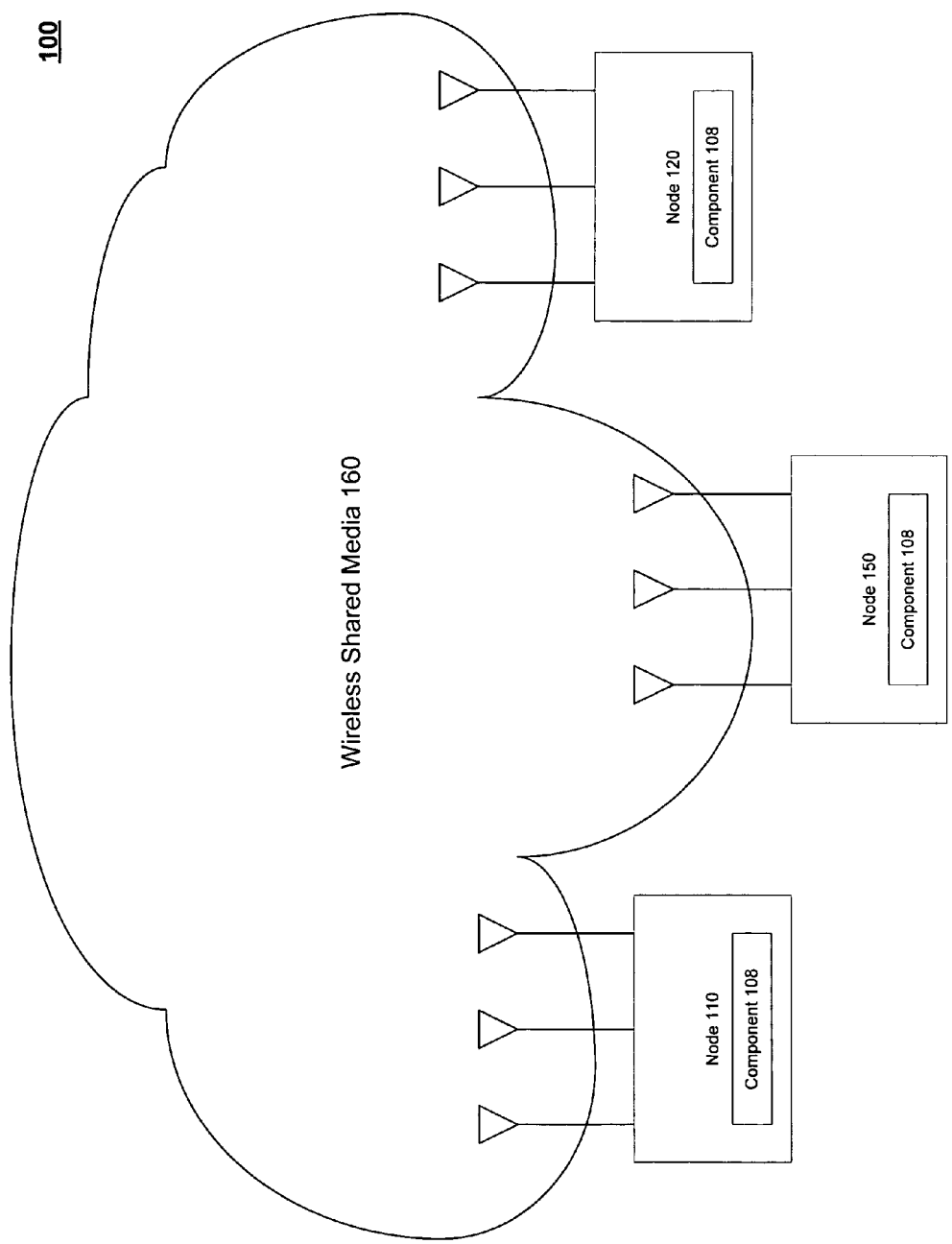
FIG. 1 illustrates one embodiment of a system.

FIG. 1 illustrates one embodiment of a system. FIG. 1 may illustrate a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, numerical information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with various wireless local area network (WLAN) protocols, such as the IEEE 802.11 series of protocols. In another example, system 100 may operate in accordance with various wireless metropolitan area network (WMAN) mobile broadband wireless access (MBWA) protocols, such as a protocol from the IEEE 802.16 or 802.20 series of protocols. The embodiments are not limited in this context.

Referring again to FIG. 1, system 100 may comprise a wireless communication system. In one embodiment, system 100 may comprise a WLAN or WMAN system operating in accordance with the IEEE 802.11, 802.16 or 802.20 series of standard protocols. System 100 may include one or more wireless communication devices, such as nodes 110, 120, 150. The wireless communication devices may all be arranged to communicate information signals using wireless shared media 160. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may include nodes 110, 120. Nodes 110, 120 may comprise fixed devices having wireless capabilities. A fixed device may comprise a generalized equipment set providing connectivity, management, and control of another device, such as mobile devices. Examples for nodes 110, 120 may include a wireless access point (AP), base station or node B, router, switch, hub, gateway, and so forth. In one embodiment, for example, nodes 110, 120 may comprise access points for a WLAN system. Nodes 110, 120 may also provide access to a network (not shown). The network may comprise, for example, a packet network such as the Internet, a corporate or enterprise network, a voice network such as the Public Switched Telephone Network (PSTN), and so forth. Although some embodiments may be described with nodes 110, 120 implemented as access points by way of example, it may be appreciated that other embodiments may be implemented using other wireless devices as well.

In one embodiment, system 100 may include node 150. Node 150 may comprise, for example, a mobile device having wireless capabilities. Mobile device 150 may comprise a generalized equipment set providing connectivity to other wireless devices, such as other mobile devices or fixed devices. Examples for mobile device 150 may include a computer, server, workstation, notebook computer, handheld computer, telephone, cellular telephone, personal digital assistant (PDA), combination cellular telephone and PDA, and so forth. In one embodiment, for example, mobile device 150 may be implemented as a mobile station (STA) for a WLAN, or a mobile subscriber station (MSS) for a WMAN. Although some embodiments may be described with mobile device 150 implemented as a STA by way of example, it may be appreciated that other embodiments may be implemented using other wireless devices as well. The embodiments are not limited in this context.

Nodes 110, 120, 150 may have one or more wireless transmitters/receivers ("transceivers") and wireless antennas. In one embodiment, for example, nodes 110, 120, 150 may each have a single transceiver and a single antenna. In another embodiment, for example, nodes 110, 120, 150 may each have multiple transceivers and multiple antennas. The use of multiple antennas may be used to provide a spatial division multiple access (SDMA) system or a multiple-input multiple-output (MIMO) system, for example. The embodiments are not limited in this context.

In general operation, the nodes of system 100 may operate in multiple operating modes. For example, nodes 110, 120, 150 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 160.

In system 100, STA 150 may roam between various AP, such as AP 110, 120. When moving to a new AP, STA 150 may need to establish a connection with the new AP without disrupting network service. Such operations are sometimes referred to as "handoff" operations. For example, if STA 150 roams from AP 110 to AP 120, certain real-time multimedia applications may require STA 150 to establish a connection with AP 120 within a certain time limit to reduce interruptions in network service and maintain the same level of quality of service from AP 120. Handoff latency, however, may be significant when STA 150 roams from AP 110 to AP 120. Such latency in establishing a new connection may be undesirable, since it may reduce system performance and user satisfaction.

Some embodiments may solve these and other problems. In one embodiment, for example, nodes 110, 120, 150 may each include a component 108. Component 108 may be arranged to communicate roaming information between nodes 110, 120, 150. The roaming information may comprise various identifiers and parameters to allow a mobile device to prepare to establish a connection with a new AP. For example, the roaming information may allow node 150 to perform improved handoff operations when roaming between AP 110, 120. AP 110 may include a processor to receive the roaming information for STA 150 from AP 120. AP 110 may send the roaming information received from AP 120 to STA 150. STA 150 may use the roaming information received from AP 110 to establish a connection with AP 120 when STA 150 moves within transmission range of AP 120. Other embodiments are described and claimed.

Figure 2:
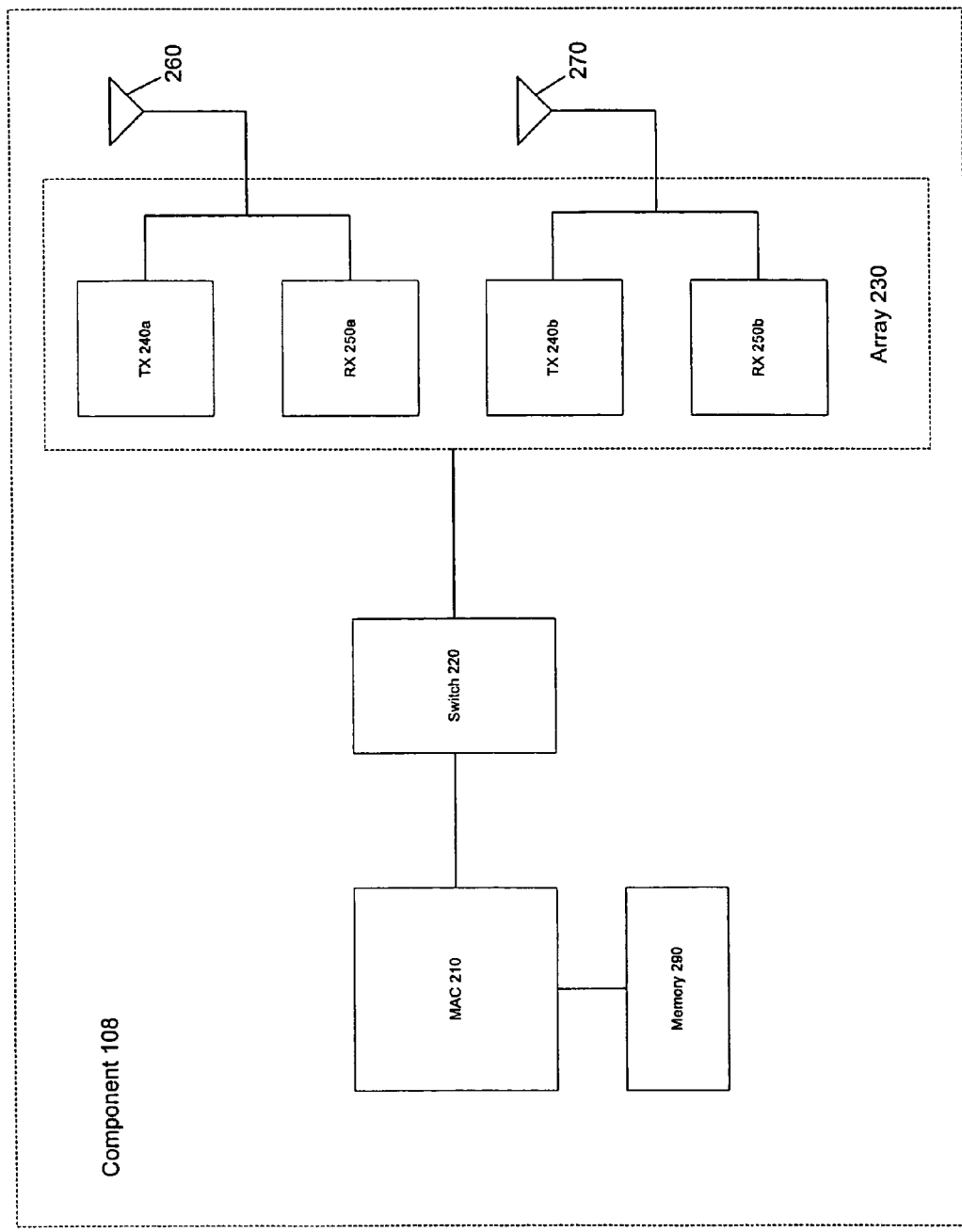
FIG. 2 illustrates one embodiment of a component.

FIG. 2 illustrates one embodiment of a component. FIG. 2 may illustrate a block diagram for component 108 of system 100. Component 108 may be implemented as part of nodes 110, 120 or 150 as described with reference to FIG. 1. As shown in FIG. 2, component 108 may comprise multiple elements, such as processor 210, switch (SW) 220, and a transceiver array 230. Some elements may be implemented using, for example, one or more circuits, components, registers, processors, software subroutines, or any combination thereof. Although FIG. 2 shows a limited number of elements, it can be appreciated that more or less elements may be used in component 108 as desired for a given implementation. The embodiments are not limited in this context.

In one embodiment, component 108 may include a transceiver array 230. Transceiver array 230 may be implemented as, for example, a MIMO system. MIMO system 230 may include two transmitters 240a and 240b, and two receivers 250a and 250b. Although MIMO system 230 is shown with a limited number of transmitters and receivers, it may be appreciated that MIMO system 230 may include any desired number of transmitters and receivers. The embodiments are not limited in this context.

In one embodiment, transmitters 240a-b and receivers 250a-b of MIMO system 230 may be implemented as Orthogonal Frequency Division Multiplexing (OFDM) transmitters and receivers. Transmitters 240a-b and receivers 250a-b may communicate data frames with other wireless devices. For example, when implemented as part of AP 110, 120, transmitters 240a-b and receivers 250a-b may communicate data frames with STA 150. When implemented as part of STA 150, transmitters 240a-b and receivers 250a-b may communicate data frames with AP 110, 120. The data frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240a and receiver 250a may be operably coupled to an antenna 260, and transmitter 240b and receiver 250b may be operably coupled to antenna 270. Examples for antenna 260 and/or antenna 270 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. The embodiments are not limited in this context.

In one embodiment, component 108 may include a processor 210. Processor 210 may be implemented as a general purpose processor, such as a processor made by Intel® Corporation, for example. Processor 210 may also comprise a dedicated processor, such as a controller, microcontroller, embedded processor, a digital signal processor (DSP), a network processor, an input/output (I/O) processor, a media processor, and so forth. The embodiments are not limited in this context.

In one embodiment, component 108 may include a memory 290. Memory 290 may comprise any machine-readable or computer-readable media capable of storing data, including both volatile and non-volatile memory. For example, memory 290 may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

In one embodiment, for example, processor 210 may be arranged to perform MAC layer and/or physical (PHY) layer operations. For example, processor 210 may be implemented as a media access control (MAC) processor. MAC 210 may be arranged to perform MAC layer processing operations. In addition, MAC 210 may be arranged to manage handoff operations for the mobile devices and fixed devices of system 100.

In one embodiment, component 108 may be implemented for each node in system 100. For example, STA 150 may use component 108 to query roaming information from a target AP (e.g., node 120) through a serving AP (e.g., node 110) before STA 150 roams to the target AP. Based on the roaming information received from the query, STA 150 can select roaming protocols and network protocols to establish a connection with the target AP with reduced handoff latency. Component 108 thereby enables wireless devices to accelerate the handoff process and improve roaming performance for time bounded traffic. Component 108 may be used in wireless devices to enhance voice over packet (VOP) and packet video performance, and enable richer WLAN or WMAN experiences for real time multimedia mobile users.

As previously described, handoff latency may be significant when STA 150 roams from AP 110 to AP 120. Three major sources of handoff latency may include authentication operations typically performed at the MAC layer, network address assignments (e.g., IP address) typically performed at the IP layer, and service bandwidth reservation operations typically performed at the application layer or network layer. Some embodiments may be arranged to manage handoff operations to reduce the latency incurred by these and other sources of handoff latency.

In one embodiment, for example, component 108 may be arranged to reduce latency associated with network address assignment operations. Network address assignments typically involve the allocation of a network address, such as an IP address, to a mobile device. Some mobile devices may use dynamic host configuration protocol (DHCP) and mobile IP services to receive IP addresses from an AP. When a mobile device moves from a service AP to a target AP, the mobile device may need to perform network address assignment operations again to receive a new IP address. If the service AP and target AP use the same subnet as indicated by network identifiers, however, the network address assignment operations may be reduced or eliminated. The mobile device may use the same IP address previously assigned by the service AP to form a new connection with the target AP.

In one embodiment, component 108 may determine whether a new IP address is needed for STA 150 using a connectivity parameter. If the target AP uses the same subnet as the service AP as indicated by network identifiers, the connectivity parameter may be set to 0 (False). When the connectivity parameter is set to 0 (False), STA 150 may skip certain network address assignment operations, such as the DHCP IP address assignment, and use its existing IP address. If the target AP uses a different subnet than the service AP as indicated by network identifiers, the connectivity parameter may be set to 1 (True). When the connectivity parameter is set to 1 (True), STA 150 may need to perform network address assignment operations to receive a new IP address for the new connection with the target AP.

In one embodiment, for example, component 108 may be arranged to reduce latency associated with bandwidth reservation operations. In order to successfully initiate a voice or video call, a mobile device may need to perform certain bandwidth reservation operations. For example, the mobile device may request a radio resource from the AP, and a certain amount of network bandwidth from a backbone voice or video server. Some AP may also perform bandwidth reservation operations on behalf of the mobile device. This backend reservation scheme may be initiated when an AP receives a request from the mobile device. The request may comprise, for example, an IEEE 802.11e admission control request. When switching from a service AP to a target AP, the mobile device may need to perform the bandwidth reservation operations again to reserve the appropriate bandwidth for a new connection with the target AP. If the target AP and service AP are associated with the same video or voice server as indicated by bandwidth server identifiers, however, the bandwidth reservation operations may be reduced or eliminated. The target AP may reallocate similar bandwidth to the mobile device as allocated by the service AP, as constrained by the resources currently available to the target AP.

In one embodiment, component 108 may determine whether a new bandwidth reservation request is needed for STA 150 using a bandwidth parameter. If the target AP uses the same voice or video server as the service AP as indicated by bandwidth server identifiers, the bandwidth parameter may be set to 0 (False). When the bandwidth parameter is set to 0 (False), STA 150 may skip certain bandwidth reservation operations, such network service reservations typically associated with the voice or video server. If the target AP uses a different voice or video server than the service AP as indicated by bandwidth server identifiers, the bandwidth parameter may be set to 1 (True). When the bandwidth parameter is set to 1 (True), STA 150 may need to perform bandwidth reservation operations to receive a new bandwidth allocation for the new connection with the target AP. It is worthy to note that radio reservation operations for the target AP may need to be performed regardless of the setting for the bandwidth parameter, as based on the current bandwidth/capacity of the target AP at a given point in time.

In one embodiment, for example, component 108 may be arranged to reduce latency associated with authentication operations. In order to establish a secure connection between a mobile device and an AP, the mobile device may need to perform certain authentication operations. For example, to establish a secure connection with an AP, the mobile device may need to identify itself to the AP, select a security protocol or algorithm, receive a private encryption key, and so forth. When switching from a service AP to a target AP, the mobile device may need to perform the authentication operations again to establish a new secure connection with the target AP. If the target AP and service AP use the same security techniques as indicated by security identifiers, the service AP may communicate the security settings to the target AP prior to the mobile device connecting to the target AP. In this manner, the authentication operations may be reduced or eliminated.

In one embodiment, component 108 may determine whether new authentication operations are needed for STA 150 using one or more security parameters. If the target AP uses the same security techniques as the service AP as indicated by service identifiers, a security parameter may be set to 0 (False). Additional security parameters may provide the current security settings, such as an authentication code, authentication server ID, security algorithm, encryption key, and so forth. When the service parameter is set to 0 (False), STA 150 may skip certain authentication operations and use its existing security settings. If the target AP uses a different security technique than the service AP, the security parameter may be set to 1 (True). When the security parameter is set to 1 (True), STA 150 may need to perform authentication operations to receive new security settings to establish a new secure connection with the target AP.

It may be appreciated that the connectivity parameter, bandwidth parameter and security parameter serve as examples of the type of roaming information communicated between the service AP and the target AP. Parameters may be defined for any number of network services, operations or protocols as desired for a given implementation or design constraint in order to reduce the amount of time needed to establish a connection with the target AP. The embodiments are not limited in this context.

Further, the roaming information may also include a number of different identifiers. The various defined parameters may be evaluated and set using the different identifiers. For example, the roaming information may include a device identifier to provide a physical address for a device, such as a MAC address. In another example, the roaming information may include a network identifier. In yet another example, the roaming information may include a service identifier to identify different services provided by an AP, such as streaming multimedia services, email services, Internet services, and so forth. In still another example, the roaming information may include a transaction identifier to identify a unique transaction or session between a mobile device and AP, such as for ecommerce applications. In still another example, the roaming information may include a provider identifier to identify a particular service provider. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
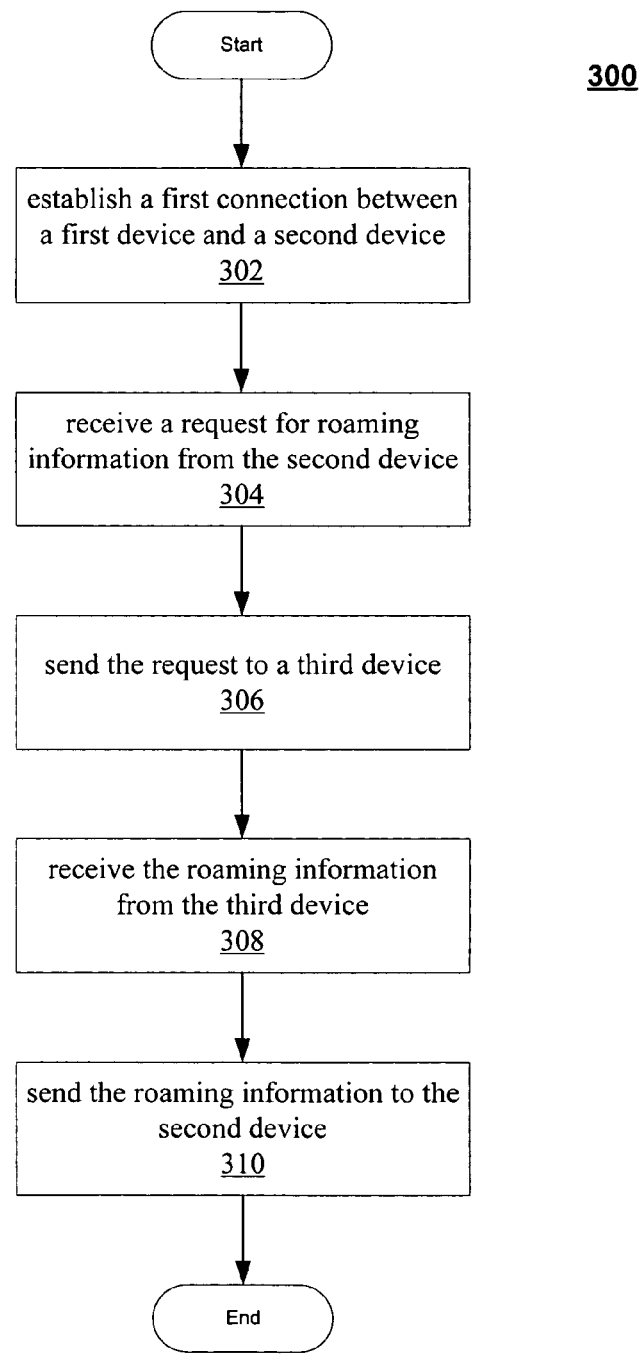
FIG. 3 illustrates one embodiment of a logic flow.

FIG. 3 illustrates one embodiment of a logic flow. FIG. 3 may illustrate a block flow diagram of a logic flow 300. Logic flow 300 may be representative of the operations executed by one or more systems described herein, such as component 108 as implemented as part of nodes 110, 120 or 150, for example. As shown in logic flow 300, a first connection may be established between a first device and a second device at block 302. A request for roaming information may be received from the second device at block 304. The request may be sent to a third device at block 306. The roaming information may be received from the third device at block 308. The roaming information may be sent to the second device at block 310. A second connection between the second device and said third device may be established using the roaming information. The embodiments are not limited in this context.

In one embodiment, the roaming information may include a number of different identifiers and parameters. For example, the roaming information may comprise one or more of a connectivity parameter, bandwidth parameter, and security parameter. In another example, the roaming information may comprise one or more of a device identifier, a network identifier, a connectivity parameter, a service identifier, a security parameter, a transaction identifier, a service provider identifier and a bandwidth server identifier. The embodiments are not limited in this context.

In one embodiment, the request for roaming information may be received by the third device. The roaming information may be sent from the third device to the first device. The embodiments are not limited in this context.

In one embodiment, the request for roaming information may be sent to the first device. The roaming information may be received by the second device. The embodiments are not limited in this context.

Figure 4A:
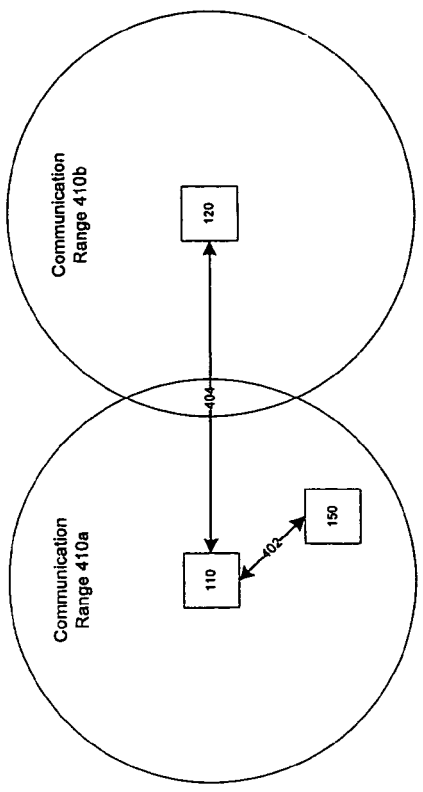
FIGS. 4A-C illustrate one embodiment of handoff operations.
Figure 4B:
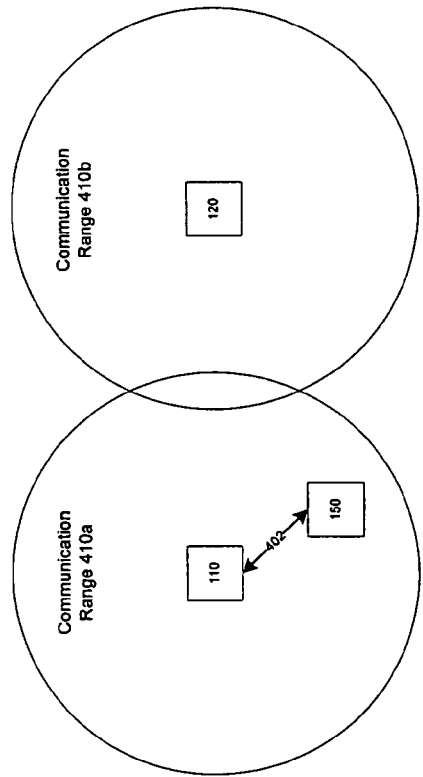
Figure 4C:
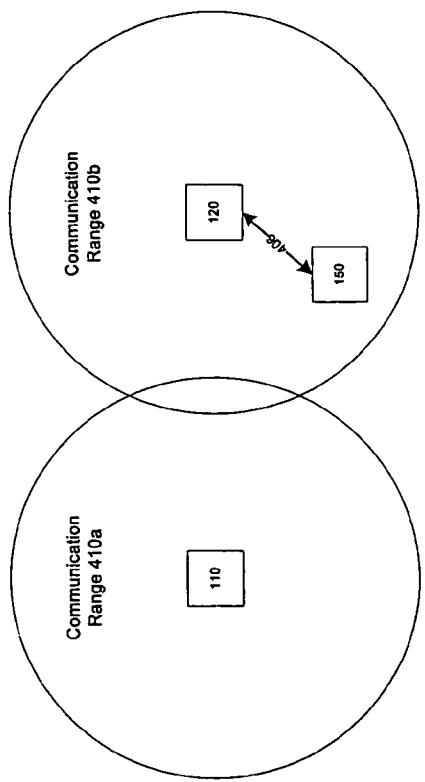

FIGS. 4A-C may illustrate one embodiment of handoff operations. FIGS. 4A-C may illustrate handoff operations between nodes 110, 120, 150 of system 100. AP 110, 120 may have overlapping communication ranges 410a, 410b, respectively, as indicated by the respective circles around AP 110, 120.

As shown in FIG. 4A, STA 150 may establish a connection 402 with AP 110 when within communication range 410a. In one embodiment, for example, connection 402 may comprise secure connection. Secure connection 402 may be established using a number of security techniques, such as defined by the IEEE 802.11 or 802.11i Advanced Security Group (ASG) series of protocols, for example. Having a secure connection 402 between STA 150 and AP 110 may provide protection against eavesdropping, malicious modifications, and replay attacks. The embodiments are not limited in this context.

At some point, STA 150 may determine that it may need to switch to a new AP. STA 150 may make this determination based on, for example, a received signal strength indicator for connection 402. Once STA 150 determines that it needs to switch to a new AP, STA 150 may begin searching for a target AP. STA 150 may search for candidates for the target AP by receiving signals from any number of proximate AP, such as AP 120. Once STA 150 identifies a potential target AP such as AP 120, STA 150 may send a request for roaming information about AP 120 to AP 110 over connection 402.

As shown in FIG. 4B, AP 110 may receive the request from STA 150, and establish a connection 404 with AP 120. Connection 404 may comprise, for example, a wireless connection using wireless shared media 160, or a wired connection through a common network between AP 110, 120, such as the Internet, connected mobile subscriber stations (MSC), and so forth. AP 110 may forward the request from STA 150 to AP 120 over connection 404. AP 120 may receive the request from AP 110, and send the roaming information to AP 110. AP 110 may receive the roaming information from AP 120, and send the roaming information to STA 150.

As shown in FIG. 4C, STA 150 may receive the roaming information from AP 110. When within communication range 410b of AP 120, STA 150 may initiate handoff operations to disconnect connection 402 with AP 110, and form a new connection with AP 120. STA 150 may use the roaming information to establish a connection 406 with AP 120. The roaming information may assist STA 150 and AP 120 to establish connection 406 with reduced latency relative to conventional techniques. For example, STA 150 may use the various identifiers and parameters included within the roaming information to bypass certain operations when forming connection 406, such as authentication operations, network address assignment operations, security operations, and other operations. The embodiments are not limited in this context.

Figure 5:
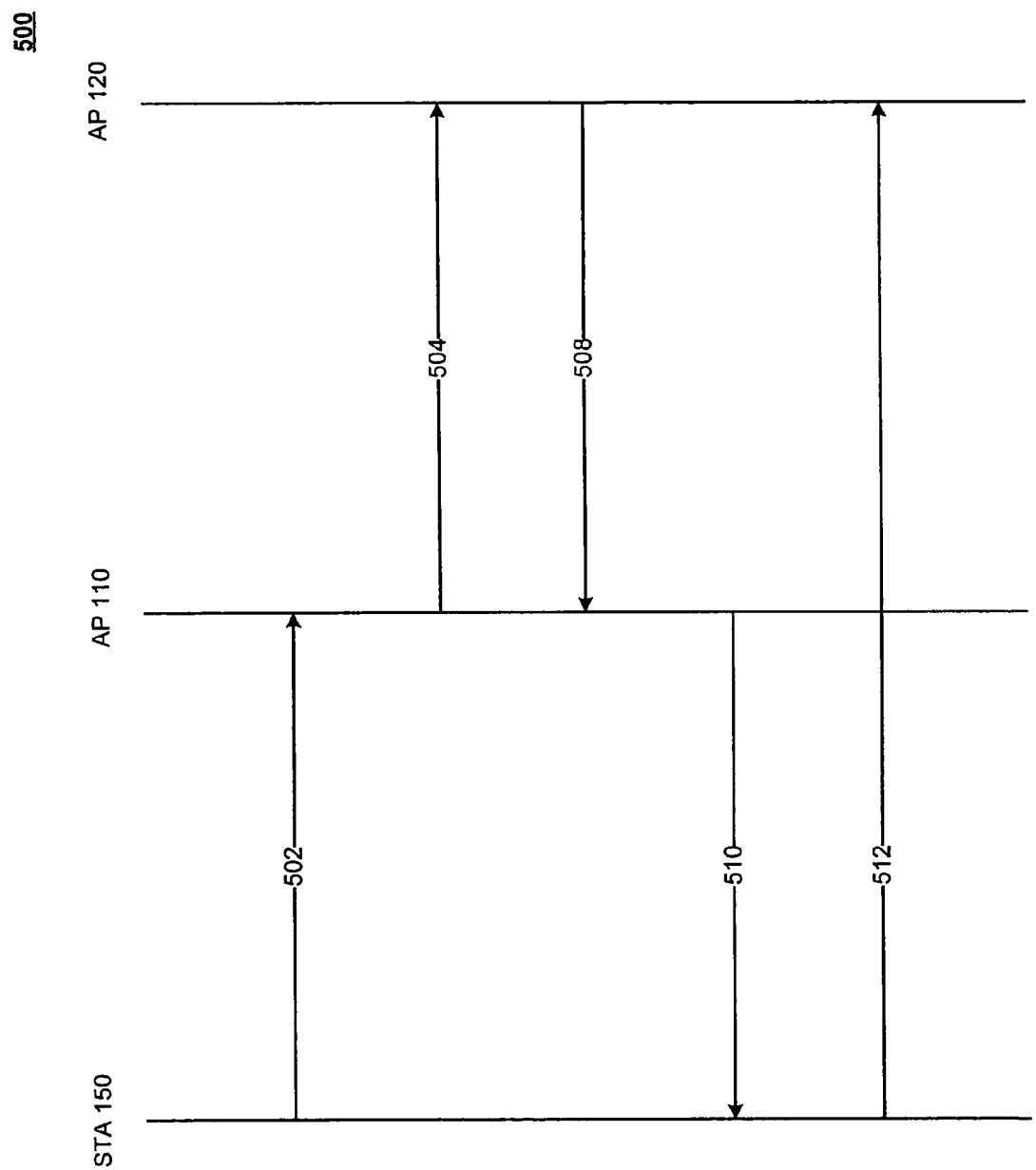
FIG. 5 illustrates one embodiment of a message flow.

FIG. 5 illustrates one embodiment of a message flow. FIG. 5 illustrates a message flow 500. Message flow 500 may represent the messages communicated between STA 150, AP 110 and AP 120 during handoff operations as STA 150 moves from communication range 410a of AP 110 to communication range 410b of AP 120.

In one embodiment, component 108 may be used to implement a target AP roaming information query scheme through the current associated AP. Four new message or action frames may be used by component 108. The action frames may include a roaming request, a roaming notification request, a roaming notification response, and a roaming response. It may be appreciated that other action frames may be used by component 108 as well, and the embodiments are not limited in this context.

As described with reference to FIG. 4A. STA 150 may have an existing connection (e.g., connection 402) with AP 110. STA 150 may select a target AP (e.g., AP 120) to establish a new connection (e.g., connection 406). After selecting AP 120, STA 150 may send a roaming request message 502 to AP 110. Roaming request message 502 may include a MAC address for STA 150, a basic service set identifier (BSSID) for AP 120, and a traffic specification (TSPEC) identifier as defined by the IEEE 802.1 1e standard. Roaming request message 502 may also include other roaming information, such as a network identifier, transaction identifier, bandwidth server identifier, and so forth. The embodiments are not limited in this context.

When AP 110 receives roaming request message 502, AP 110 embeds roaming request message 502 into a roaming notification request message 504. AP 110 may send roaming notification request message 504 to AP 120 over connection 404.

When AP 120 receives roaming notification request message 504 from AP 110, AP 120 may extract roaming request message 502. AP 120 may then retrieve a unique transaction identifier, such as a Pairwise Master Key Security Association (PMKSA) identifier as defined by the IEEE 802.11i standard, a BSSID for AP 120, and so forth. AP 120 may use the various identifiers to set various parameters.

In one embodiment, for example, AP 120 may compare the received network identifier from AP 110 with its network identifier. If the network identifiers match, AP 120 may set the connectivity parameter to 0 (False). If the network identifiers do not match, AP 120 may set the connectivity parameter to 1 (True).

In one embodiment, for example, AP 120 may also compare the bandwidth server identifier from AP 110 with its bandwidth server identifier. If the bandwidth server identifiers match, AP 120 may set the bandwidth parameter to 0 (False). If the bandwidth server identifiers do not match, AP 120 may set the bandwidth parameter to 1 (True). AP 120 may also evaluate its current bandwidth/capacity, and form a suggested TSPEC. AP 120 can calculate the granted bandwidth based on a number of factors, such as an amount of available radio resources, available bandwidth of other networks and network servers (e.g., voice or video server bandwidth), and so forth. The embodiments are not limited in this context.

Once AP 120 completes the requested actions, AP 120 may generate a roaming response message 510. AP 120 may embed roaming response message 510 in a roaming notification response message 508. AP 120 may send roaming notification response message 508 to AP 110. Roaming notification response message 510 may include the MAC address for STA 150, the BSSID for AP 120, the connectivity parameter, the bandwidth parameter and suggested TSPEC.

When AP 110 receives roaming notification response message 508, AP 110 may extract roaming response message 510 from roaming notification response message 508. AP 110 may send roaming response message 510 to STA 150. STA 150 can use the roaming information to improve handoff operations. For example, when STA 150 is within communication range 410*b* of AP 120, STA 150 may send message 512 to AP 120 requesting a connection. STA 150 and AP 120 may use the roaming information to more quickly establish connection 406.

Some embodiments may provide several advantages relative to conventional handoff operations. For example, some embodiments may provide a secure roaming query scheme by querying the roaming information over the wired network of the AP with which it is currently associated. Since it is only a query rather than a reservation, the Target AP does not necessarily need to maintain state machines, thereby significantly reducing the complexity of the target AP. In another example, some embodiments potentially reduce certain handoff operations, such as network address assignment operations, bandwidth reservation operations, authentication operations, and other operations.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS), Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising a first fixed wireless device having a media access control processor to receive a request for roaming information from a mobile device, send said request to a second fixed wireless device, receive roaming information for said mobile device from said second fixed wireless device, determine whether or not the first and second fixed wireless devices share the same subnet, and send said roaming information from said first fixed wireless device to said mobile device to establish a connection with said second fixed wireless device, said roaming information indicating whether or not the first and second fixed wireless devices share the same subnet and, when the same subnet is shared, that the mobile device uses an internet protocol (IP) address assigned by the first fixed wireless device when establishing the connection with the second fixed wireless device.

2. The apparatus of claim 1, said connection to comprise one of a wireless local area network connection and wireless metropolitan area network connection.

3. The apparatus of claim 1, said roaming information to comprise at least one of connectivity parameter, a bandwidth parameter, and a security parameter.

4. A system, comprising:
   an antenna;
   a transceiver to couple to said antenna; and
   a first fixed wireless device having a media access control processor to couple to said transceiver, said media access control processor to receive a request for roaming information from a mobile device, send said request to a second fixed wireless device, receive roaming information for said mobile device from said second fixed wireless device, determine whether or not the first and second fixed wireless devices share the same subnet, and send said roaming information from said first fixed wireless device to said mobile device to establish a connection with said second fixed wireless device, said roaming information indicating whether or not the first and second fixed wireless devices share the same subnet and, when the same subnet is shared, that the mobile device uses an internet protocol (IP) address assigned by the first fixed wireless device when establishing the connection with the second fixed wireless device.

5. The system of claim 4, said connection to comprise one of a wireless local area network connection and wireless metropolitan area network connection.

6. The system of claim 4, said roaming information to comprise at least one of connectivity parameter, a bandwidth parameter, and a security parameter.

7. A method, comprising:
   establishing a first connection between a first fixed wireless device and a mobile device;
   receiving a request for roaming information at said first fixed wireless device from said mobile device;
   sending said request from said first fixed wireless device to a second fixed wireless device;
   receiving said roaming information from said second fixed wireless device at said first fixed wireless device;
   determining, at said first fixed wireless device, whether or not the first and second fixed wireless devices share the same subnet; and
   sending said roaming information from said first fixed wireless device to said mobile device, said roaming information indicating whether or not the first and second fixed wireless devices share the same subnet and, when the same subnet is shared, that the mobile device uses an internet protocol (IP) address assigned by the first fixed wireless device when establishing a connection with the second fixed wireless device.

8. The method of claim 7, comprising establishing a second connection between said mobile device and said second fixed wireless device using said roaming information.

9. The method of claim 7, said roaming information to comprise at least one of connectivity parameter, a bandwidth parameter, and a security parameter.

10. The method of claim 7, comprising:
    receiving said request for roaming information by said second fixed wireless device; and
    sending said roaming information to said first fixed wireless device.

11. The method of claim 7, comprising:
    sending said request for roaming information to said first fixed wireless device; and
    receiving said roaming information by said mobile device.

12. An article comprising a computer-readable storage medium containing instructions that when executed by a processor enable a system to establish a first connection between a first fixed wireless device and a mobile device, receive a request for roaming information at said first fixed wireless device from said mobile device, send said request from said first fixed wireless device to a second fixed wireless device, receive said roaming information from said second fixed wireless device at said first fixed wireless device, determine, at said first fixed wireless device, whether or not the first and second fixed wireless devices share the same subnet, and send said roaming information from said first fixed wireless device to said mobile device, said roaming information indicating whether or not the first and second fixed wireless devices share the same subnet and, when the same subnet is shared, that the mobile device uses an internet protocol (IP) address assigned by the first fixed wireless device when establishing a connection with the second fixed wireless device.

13. The article of claim 12, further comprising instructions that if executed enable the system to establish a second connection between said mobile device and said second fixed wireless device using said roaming information.

14. The article of claim 12, said roaming information to comprise at least one of connectivity parameter, a bandwidth parameter, and a security parameter.

15. The article of claim 12, further comprising instructions that if executed enable the system to receive said request for roaming information by said second fixed wireless device, and send said roaming information to said first fixed wireless device.

16. The article of claim 12, further comprising instructions that if executed enable the system to send said request for roaming information to said first fixed wireless device, and receive said roaming information by said mobile device.

* * * * *